US012608140B1

(12) United States Patent (10) Patent No.: US 12,608,140 B1
Zhang et al. (45) Date of Patent: Apr. 21, 2026

(54) GROUP HISTORY READ METHOD TO IMPROVE QUALITY OF SERVICE OF SOLID STATE DRIVES

(71) Applicant: SK hynix Inc., Gyeonggi-do (KR)

(72) Inventors: Fan Zhang, San Jose, CA (US); Pengfei Huang, San Jose, CA (US)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 19/033,486

(22) Filed: Jan. 22, 2025

(51) Int. Cl.
*G06F 3/00* (2006.01)
*G06F 3/06* (2006.01)
(52) U.S. Cl.
CPC .......... *G06F 3/0619* (2013.01); *G06F 3/0644* (2013.01); *G06F 3/0659* (2013.01); *G06F 3/0679* (2013.01)
(58) Field of Classification Search
CPC .... G06F 3/0619; G06F 3/0644; G06F 3/0659; G06F 3/0679
See application file for complete search history.

(56) References Cited

U.S. PATENT DOCUMENTS

| | | | | |
|---|---|---|---|---|
| 2008/0002464 A1* | 1/2008 | Maayan | ................. | G11C 16/28 |
| | | | | 365/185.2 |
| 2011/0182119 A1* | 7/2011 | Strasser | ............... | G11C 29/021 |
| | | | | 365/185.24 |
| 2013/0007564 A1* | 1/2013 | Bedeschi | ................. | G11C 8/12 |
| | | | | 714/763 |

* cited by examiner

*Primary Examiner* — Craig S Goldschmidt
(74) *Attorney, Agent, or Firm* — IP & T GROUP LLP

(57) ABSTRACT

A method and associated memory system for reading data from a memory. The method reads data from a memory group of the memory; calculates a group divergence metric for read biases used to read the data from the memory group; when the group divergence metric meets a threshold, partitions the memory group into a first sub-group and a second sub-group, wherein the first sub-group has a lower error rate than the second sub-group; reads data from the first and second sub-groups; calculates respective sub-group divergence metrics for the read biases used to read the data from the first and second sub-groups; and when one of the sub-group divergence metrics meets the threshold, partitions the one sub-group of the first and second sub-groups which met the threshold into a third sub-group.

20 Claims, 8 Drawing Sheets

$$600 \sim \quad H = \begin{bmatrix} 1 & 0 & 1 & 0 & 0 & 1 \\ 1 & 1 & 0 & 0 & 1 & 0 \\ 1 & 0 & 0 & 1 & 0 & 0 \\ 0 & 1 & 0 & 1 & 0 & 1 \end{bmatrix}$$

Variable Nodes
71

Check Nodes
73

71
User
Bits

73
Check
Nodes

72
Parity
Bits

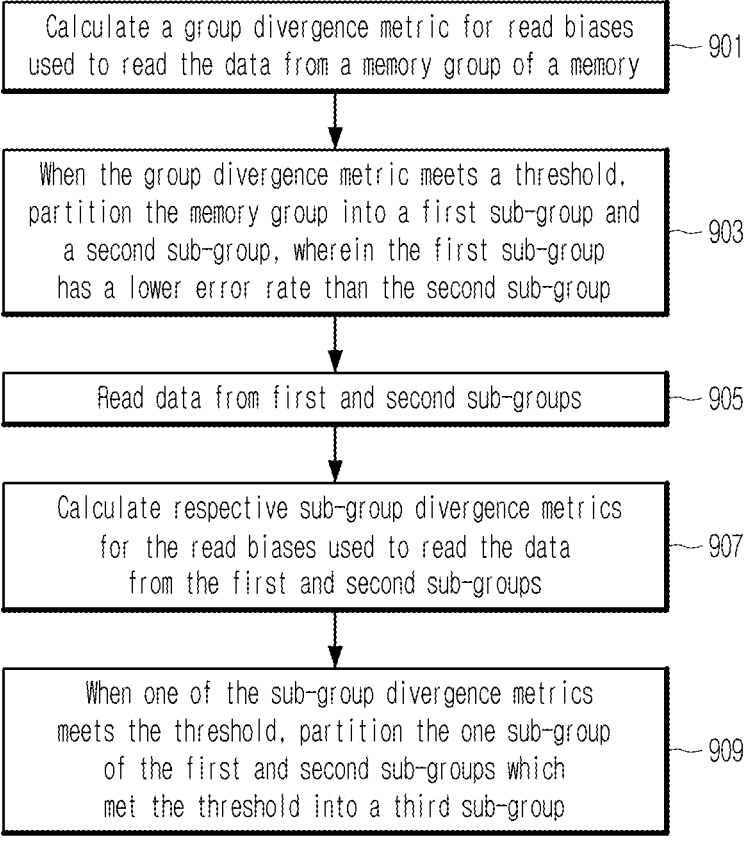

Calculate a group divergence metric for read biases
used to read the data from a memory group of a memory ～ 901

When the group divergence metric meets a threshold,
partition the memory group into a first sub-group and
a second sub-group, wherein the first sub-group
has a lower error rate than the second sub-group ～ 903

Read data from first and second sub-groups ～ 905

Calculate respective sub-group divergence metrics
for the read biases used to read the data
from the first and second sub-groups ～ 907

When one of the sub-group divergence metrics
meets the threshold, partition the one sub-group
of the first and second sub-groups which
met the threshold into a third sub-group ～ 909

GROUP HISTORY READ METHOD TO IMPROVE QUALITY OF SERVICE OF SOLID STATE DRIVES

BACKGROUND

1. Field

Embodiments of the present disclosure relate to memory systems, and methods of operating such memory systems, particularly to the operation of solid state drives.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices.

Data storage devices using memory devices provide excellent stability, durability, high information access speed, and low power consumption, since they have no moving parts. Examples of data storage devices having such advantages include universal serial bus (USB) memory devices, memory cards having various interfaces, and solid state drives (SSD).

The SSD may include flash memory components and a controller which includes the electronics that bridge the flash memory components to the SSD input/output (I/O) interfaces. The SSD controller can include an embedded processor that can execute functional components such as firmware (FW). The SSD functional components are device specific, and in most cases, can be updated.

The two main types of flash memory components are named after the NAND and NOR logic gates. The individual flash memory cells exhibit internal characteristics similar to those of their corresponding gates. The NAND-type flash memory may be written and read in blocks (or pages) which are generally much smaller than the entire memory space. The NOR-type flash memory allows a single machine word (byte) to be written to an erased location or read independently. The NAND-type flash memory operates primarily in memory cards, USB flash drives, solid-state drives, and similar products, for general storage and transfer of data.

NAND flash-based storage devices have been widely adopted because of their faster read/write performance, lower power consumption, and shock proof features. In general, however, they are more expensive compared to hard disk drives (HDD). To bring costs down, NAND flash manufacturers have been pushing the limits of their fabrication processes towards 20 nm and lower, which often leads to a shorter usable lifespan and a decrease in data reliability or Quality of Service.

In this context, embodiments of the present invention arise.

SUMMARY

Aspects of the present invention include a method for reading data from a memory. The method reads data from a memory group of the memory; calculates a group divergence metric for read biases used to read the data from the memory group; when the group divergence metric meets a threshold, partitions the memory group into a first sub-group and a second sub-group, wherein the first sub-group has a lower error rate than the second sub-group; reads data from the first and second sub-groups; calculates respective sub-group divergence metrics for the read biases used to read the data from the first and second sub-groups; and when one of the sub-group divergence metrics meets the threshold, partitions the one sub-group of the first and second sub-groups which met the threshold into a third sub-group.

Further aspects of the present invention include a memory system comprising a memory device, a controller in communication with and configured to read data from a memory group of the memory; calculate a group divergence metric for read biases used to read the data from the memory group; when the group divergence metric meets a threshold, partition the memory group into a first sub-group and a second sub-group, wherein the first sub-group has a lower error rate than the second sub-group; read data from the first and second sub-groups; calculates respective sub-group divergence metrics for the read biases used to read the data from the first and second sub-groups; and when one of the sub-group divergence metrics meets the threshold, partition the one sub-group of the first and second sub-groups which met the threshold into a third sub-group.

Other features, aspects and advantages of the present invention will become clear in view of the following description and accompanying the drawings.

BRIEF DESCRIPTION OF THE DRAWINGS

FIG. 9 is a flowchart depicting a method for reading data from a memory in accordance with one embodiment of the present invention.

DETAILED DESCRIPTION

Figure 1:
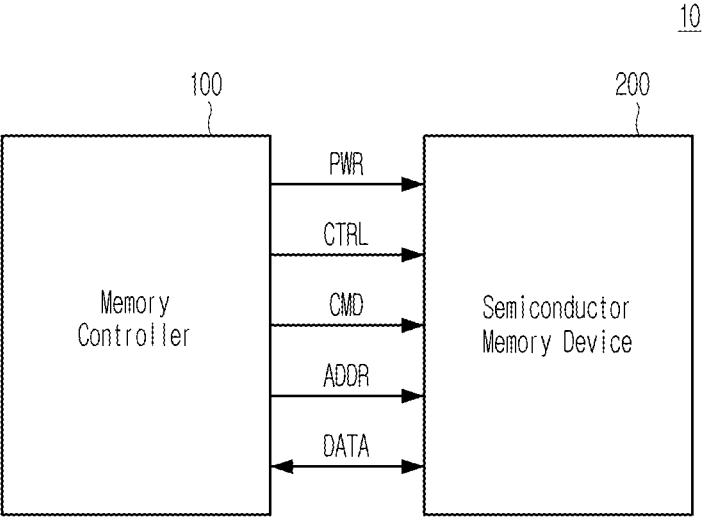
FIG. 1 is a block diagram schematically illustrating a memory system in accordance with an embodiment of the present invention.

Various embodiments are described below in more detail with reference to the accompanying drawings. The present invention may, however, be embodied in different forms and should not be construed as limited to the embodiments set forth herein. Rather, these embodiments are provided so that this disclosure is thorough and complete and fully conveys the scope of the present invention to those skilled in the art. Moreover, reference herein to "an embodiment," "another embodiment," or the like is not necessarily to only one embodiment, and different references to any such phrases is not necessarily to the same embodiment(s). Throughout the disclosure, like reference numerals refer to like parts in the figures and embodiments of the present invention.

The invention can be implemented in numerous ways, including as a process; an apparatus; a system; a composition of matter; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' refers to one or more devices, circuits, and/or processing cores suitable for processing data, such as computer program instructions.

A detailed description of embodiments of the invention is provided below along with accompanying figures that illustrate aspects of the invention. The invention is described in connection with such embodiments, but the invention is not limited to any embodiment. The scope of the invention is limited only by the claims, and the invention encompasses numerous alternatives, modifications and equivalents. Numerous specific details are set forth in the following description in order to provide a thorough understanding of the invention. These details are provided for the purpose of example; the invention may be practiced according to the claims without some or all of these specific details. For clarity, technical material that is known in technical fields related to the invention has not been described in detail so that the invention is not unnecessarily obscured.

FIG. 1 is a block diagram schematically illustrating a memory system 10 in accordance with an embodiment of the present invention.

Referring FIG. 1, the memory system 10 may include a memory controller 100 and a semiconductor memory device 200, which may represent more than one such device. The semiconductor memory device(s) 200 may be flash memory device(s).

The memory controller 100 may control overall operations of the semiconductor memory device 200.

The semiconductor memory device 200 may perform one or more erase, program, and read operations under the control of the memory controller 100. The semiconductor memory device 200 may receive a command CMD, an address ADDR and data DATA through input/output (I/O) lines. The semiconductor memory device 200 may receive power PWR through a power line and a control signal CTRL through a control line. The control signal CTRL may include a command latch enable (CLE) signal, an address latch enable (ALE) signal, a chip enable (CE) signal, a write enable (WE) signal, a read enable (RE) signal, and the like.

The memory controller 100 and the semiconductor memory device 200 may be integrated in a single semiconductor device such as a solid state drive (SSD). The SSD may include a storage device for storing data therein. When the semiconductor memory system 10 is used in an SSD, operation speed of a host (not shown) coupled to the memory system 10 may remarkably improve.

The memory controller 100 and the semiconductor memory device 200 may be integrated in a single semiconductor device such as a memory card. For example, the memory controller 100 and the semiconductor memory device 200 may be so integrated to configure a PC card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and/or a universal flash storage (UFS).

In another embodiment, the memory system 10 may be provided as one of various components in an electronic device such as a computer, an ultra-mobile PC (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

Figure 2:
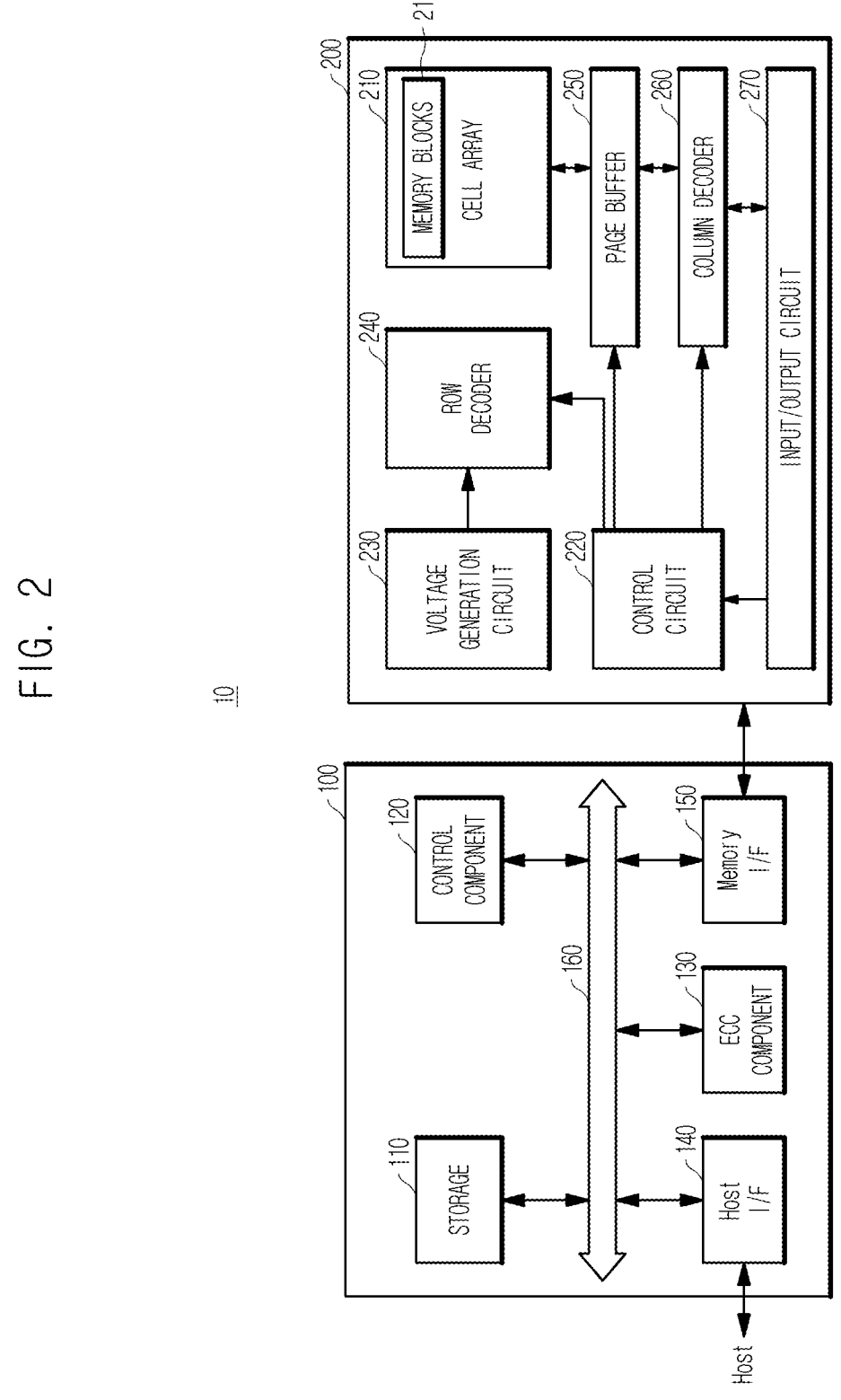
FIG. 2 is a block diagram illustrating a memory system in accordance with an embodiment of the present invention.

FIG. 2 is a detailed block diagram illustrating a memory system in accordance with an embodiment of the present invention. For example, the memory system of FIG. 2 may depict the memory system shown in FIG. 1.

Referring to FIG. 2, the memory system 10 may include a memory controller 100 and a semiconductor memory device 200. The memory system 10 may operate in response to a request from a host device, and in particular, store data to be accessed by the host device.

The host device may be implemented with any one of various kinds of electronic devices. In some embodiments, the host device may include an electronic device such as a desktop computer, a workstation, a three-dimensional (3D) television, a smart television, a digital audio recorder, a digital audio player, a digital picture recorder, a digital picture player, and/or a digital video recorder and a digital video player. In some embodiments, the host device may include a portable electronic device such as a mobile phone, a smart phone, an e-book, an MP3 player, a portable multimedia player (PMP), and/or a portable game player.

The memory device 200 may store data to be accessed by the host device.

The memory device 200 may be implemented with a volatile memory device such as a dynamic random access memory (DRAM) and/or a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device. The controller 100 may provide data read from the memory device 200 to the host device, and may store data provided from the host device into the memory device 200.

The controller 100 may include a storage 110, a control component 120, which may be implemented as a processor such as a central processing unit (CPU), an error correction code (ECC) component 130, a host interface (I/F) 140 and a memory interface (I/F) 150, which are coupled through a bus 160.

The storage 110 may serve as a working memory of the memory system 10 and the controller 100, and store data for driving the memory system 10 and the controller 100. When the controller 100 controls operations of the memory device 200, the storage 110 may store data used by the controller 100 and the memory device 200 for such operations as read, write, program and erase operations.

The storage 110 may be implemented with a volatile memory such as a static random access memory (SRAM) or a dynamic random access memory (DRAM). As described above, the storage 110 may store data used by the host device in the memory device 200 for the read and write operations. To store the data, the storage 110 may include a program memory, a data memory, a write buffer, a read buffer, a map buffer, and the like.

The control component 120 may control general operations of the memory system 10, and a write operation or a read operation for the memory device 200, in response to a write request or a read request from the host device. The control component 120 may drive firmware, which is referred to as a flash translation layer (FTL), to control general operations of the memory system 10. For example, the FTL may perform operations such as logical-to-physical (L2P) mapping, wear leveling, garbage collection, and/or bad block handling. The L2P mapping is known as logical block addressing (LBA).

The ECC component 130 may detect and correct errors in the data read from the memory device 200 during the read operation. The ECC component 130 may not correct error bits when the number of the error bits is greater than or equal to a threshold number of correctable error bits, and instead may output an error correction fail signal indicating failure in correcting the error bits.

The ECC component 130 may perform an error correction operation based on a coded modulation such as a low-density parity-check (LDPC) code, a Bose-Chaudhuri-Hoc-quenghem (BCH) code, a turbo code, a turbo product code (TPC), a Reed-Solomon (RS) code, a convolution code, a recursive systematic code (RSC), a trellis-coded modulation (TCM), or a Block coded modulation (BCM). As such, the ECC component 130 may include all circuits, systems or devices for suitable error correction operation.

The host interface 140 may communicate with the host device through one or more of various interface protocols such as a universal serial bus (USB), a multi-media card (MMC), a peripheral component interconnect express (PCI-e or PCIe), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the CPU 120. When the memory device 200 is a flash memory such as a NAND flash memory, the memory interface 150 may generate control signals for the memory and process data under the control of the CPU 120.

The memory device 200 may include a memory cell array 210, a control circuit 220, a voltage generation circuit 230, a row decoder 240, a page buffer 250, which may be in the form of an array of page buffers, a column decoder 260, and an input/output circuit 270. The memory cell array 210 may include a plurality of memory blocks 211 which may store data. The voltage generation circuit 230, the row decoder 240, the page buffer array 250, the column decoder 260 and the input/output circuit 270 may form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages of various levels. For example, in an erase operation, the voltage generation circuit 230 may generate operation voltages of various levels such as an erase voltage and a pass voltage.

The row decoder 240 may be in electrical communication with the voltage generation circuit 230, and the plurality of memory blocks 211. The row decoder 240 may select at least one memory block among the plurality of memory blocks 211 in response to a row address RADD generated by the control circuit 220, and transmit operation voltages supplied from the voltage generation circuit 230 to the selected memory blocks.

Figure 3:
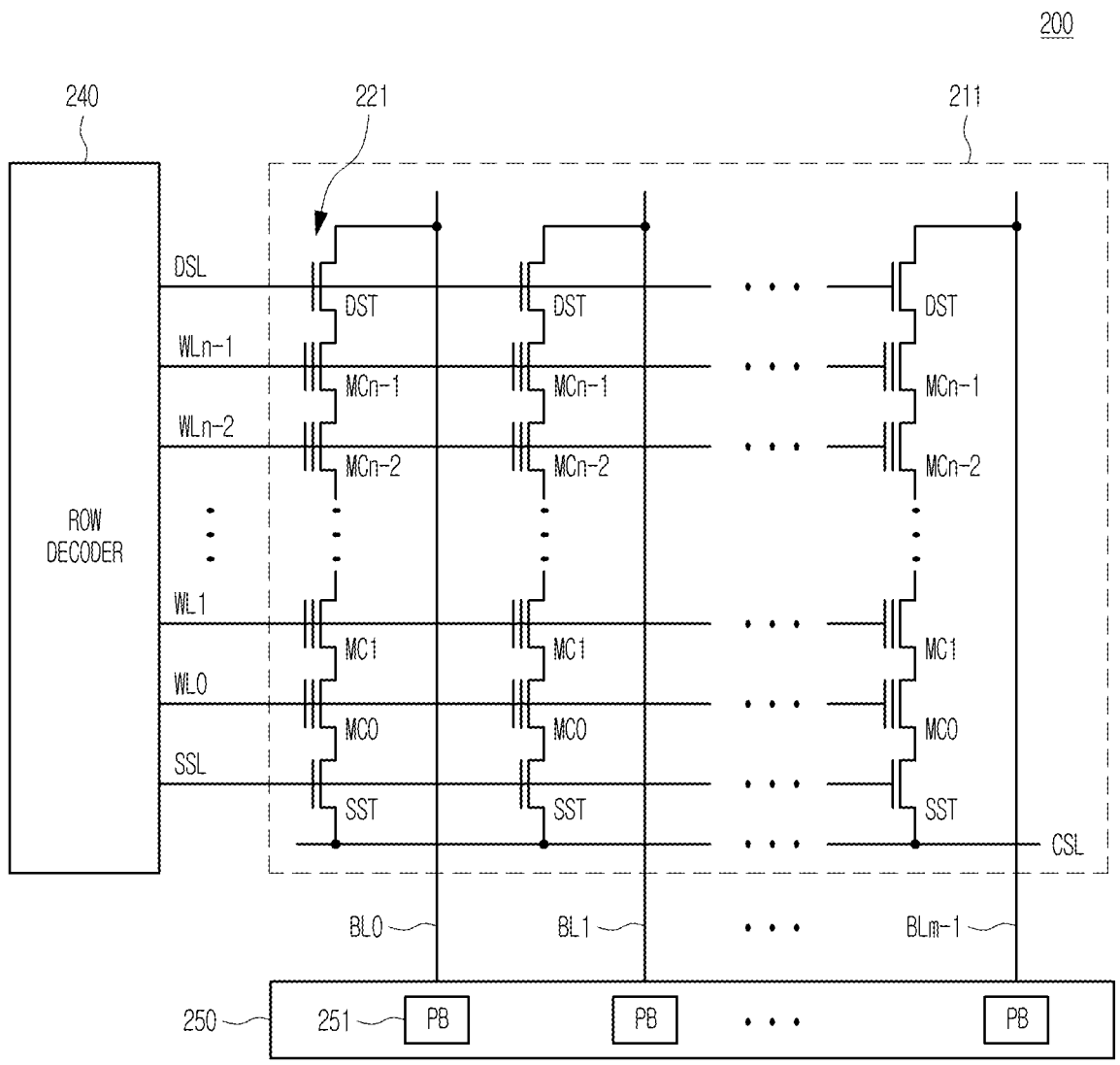
FIG. 3 is a circuit diagram illustrating a memory block of a memory device of a memory system in accordance with an embodiment of the present invention.

The page buffer 250 may be in electrical communication with the memory cell array 210 through bit lines BL (shown in FIG. 3). The page buffer 250 may precharge the bit lines BL with a positive voltage, transmit data to, and receive data from, a selected memory block in program and read operations, or temporarily store transmitted data, in response to page buffer control signal(s) generated by the control circuit 220.

The column decoder 260 may transmit data to, and receive data from, the page buffer 250 or transmit/receive data to/from the input/output circuit 270.

The input/output circuit 270 may transmit to the control circuit 220 a command and an address, received from an external device (e.g., the memory controller 100), transmit data from the external device to the column decoder 260, or output data from the column decoder 260 to the external device, through the input/output circuit 270.

The control circuit 220 may control the peripheral circuit in response to the command and the address.

FIG. 3 is a circuit diagram illustrating a memory block of a semiconductor memory device in accordance with an embodiment of the present invention. For example, the memory block of FIG. 3 may be any of the memory blocks 211 of the memory cell array 200 shown in FIG. 2.

Referring to FIG. 3, the exemplary memory block 211 may include a plurality of word lines WL0 to WLn−1, a drain select line DSL and a source select line SSL coupled to the row decoder 240. These lines may be arranged in parallel, with the plurality of word lines between the DSL and SSL.

The exemplary memory block 211 may further include a plurality of cell strings 221 respectively coupled to bit lines BL0 to BLm−1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn−1 may be serially coupled between the selection transistors DST and SST. Each of the memory cells may be formed as a multi-level cell (MLC) storing data information of multiple bits.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to corresponding word line WL0, the gates of memory cells MC1 are coupled to corresponding word line WL1, etc. The group of memory cells coupled to a particular word line may be referred to as a physical page. Therefore, the number of physical pages in the memory block 211 may correspond to the number of word lines.

The page buffer array 250 may include a plurality of page buffers 251 that are coupled to the bit lines BL0 to BLm−1. The page buffers 251 may operate in response to page buffer control signals. For example, the page buffers 251 may temporarily store data received through the bit lines BL0 to BLm−1 or sense voltages or currents of the bit lines during a read or verify operation.

In some embodiments, the memory blocks 211 may include a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

Figure 4:
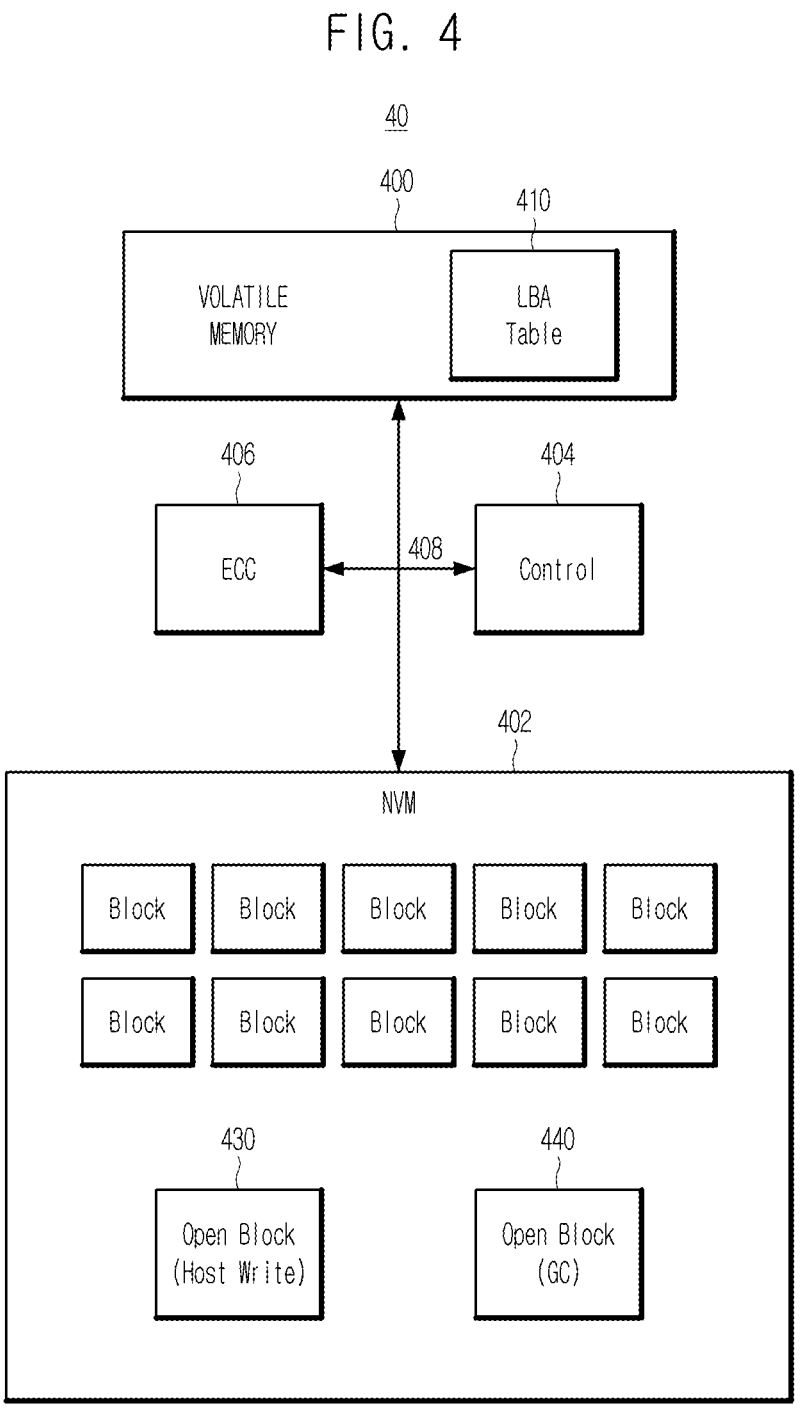
FIG. 4 is a diagram of an exemplary memory system in accordance with an embodiment of the present invention.

Referring to FIG. 4, a general example of a memory system 40 is schematically illustrated. The memory system 40 may include a volatile memory 400 (e.g., a DRAM), a non-volatile memory (NVM) 402 (e.g., NAND), a control component or control logic 404, such as described herein, an error correcting code (ECC) module 406, such as described herein, and a bus 408 through which these components of the memory system 40 communicate. The volatile memory 400 may include a logical bit address LBA table 410 for mapping physical-to-logical addresses of bits. The NVM 402 may include a plurality of memory blocks (and/or a plurality of super memory blocks), as well as an open block for host writes 430 and an open block for garbage collection (GC) 440. The memory system 40 shows a general memory system. Additional/alternative components that may be utilized with memory systems to effectuate the present invention will be understood to those of skill in the art in light of this disclosure.

As referred to herein, terms such as "NAND" or "NVM" may refer to non-volatile memories such as flash memories which may implement error correcting code processes. Further, "DRAM" may refer to volatile memories which may include components such as controllers and ECC modules.

In embodiments of the present invention, the memory system 10 may include multiple decoders that are configured to decode low-density parity-check (LDPC) codes.

There are many iterative decoding algorithms for LDPC codes, such as bit-flipping (BF) decoding algorithms, belief-propagation (BP) decoding algorithms, sum-product (SP) decoding algorithms, min-sum (MS) decoding algorithms, and Min-Max decoding algorithms.

Figures 5, 6:
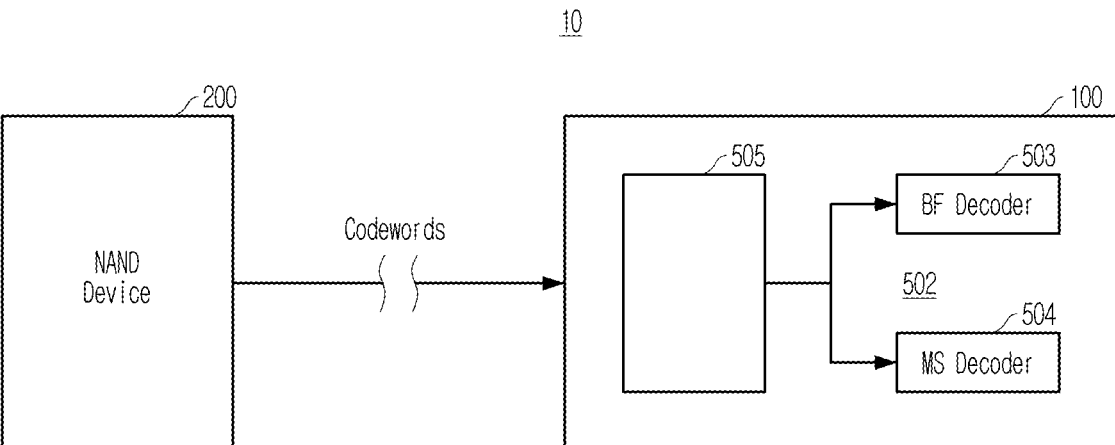
FIG. 5 is a diagram of an exemplary memory system including different decoders in accordance with an embodiment of the present invention.
FIG. 6 is a depiction of a matrix of a LDPC code.

In accordance with embodiments of the present invention, and as shown in FIG. 5, the memory system 10 may include the memory device 200, which may be a NAND device, and the memory controller 100. The memory system 10 may include decoding assembly 502, which includes a bit-flipping (BF) decoder 503 to execute a BF decoding algorithm to decode codewords read from the memory device 200 and a min-sum (MS) decoder 504 to execute an MS decoding algorithm. The BF decoder 503 and the MS decoder 504 may be embodied in the ECC component 130 (shown in FIG. 2) in the memory controller 100 or in any other suitable location. The codewords received from the memory device 200 by the memory controller 100 may be temporarily stored in a buffer or storage 505 of the memory controller 100 before being passed to one or the other of the decoders. In one embodiment of the present invention, the MS decoder 504 is a hybrid precision MS decoder (noted above and described in more detail below).

The memory system 10 may include other components (not shown) such as a checksum module, which computes checksums of codewords retrieved from the memory device 200 before decoding. The checksum module may be embodied within the memory controller 100 before the storage 505. The memory system 10 may further include cyclic redundancy check (CRC) modules disposed downstream of the BF decoder 503 and MS decoder 504, respectively. The CRC modules may be embodied within the memory controller 100.

With respect to the two decoding algorithms, MS decoding, performed by its associated decoder 504, is more powerful due to its higher complexity required to process soft input information. However, the less powerful BF decoding, performed by its associated decoder 503, is useful when the number of errors is low.

MS decoding can be used as part of an iterative LDPC decoding. LDPC codes are linear block codes defined by a sparse parity-check matrix H, which consists of zeros and ones. The term "sparse matrix" is used herein to refer to a matrix in which a number of non-zero values in each column and each row is much less than its dimension. The term "column weight" is used herein to refer to the number of non-zero values in a specific column of the parity-check matrix H. The term "row weight" is used herein to refer to number of non-zero values in a specific row of the parity-check matrix H. In general, if column weights of all of the columns in a parity-check matrix corresponding to an LDPC code are similar, the code is referred to as a "regular" LDPC code. On the other hand, an LDPC code is called "irregular" if at least one of the column weights is different from other column weights. Usually, irregular LDPC codes provide better error correction capability than regular LDPC codes.

LDPC codes are usually represented by bipartite graphs. One set of nodes, the variable or bit nodes correspond to elements of the codeword and the other set of nodes, e.g., check nodes, correspond to the set of parity-check constraints satisfied by the codeword. Typically, the edge connections are chosen at random. The error correction capability of an LDPC code is improved if cycles of short length are avoided in the graph. In a (r,c) regular code, each of the n variable nodes (V1, V2, . . . , Vn) has connections to r check nodes and each of the m check nodes (C1, C2, . . . , Cm) has connections to c bit nodes. In an irregular LDPC code, the check node degree is not uniform. Similarly, the variable node degree is not uniform. In QC-LDPC codes, the parity-check matrix H is structured into blocks of p×p matrices such that a bit in a block participates in only one check equation in the block, and each check equation in the block involves only one bit from the block. In QC-LDPC codes, a cyclic shift of a codeword by p results in another codeword. Here p is the size of square matrix which is either a zero matrix or a circulant matrix. This is a generalization of a cyclic code in which a cyclic shift of a codeword by 1 results in another codeword. The block of p×p matrix can be a zero matrix or cyclically shifted identity matrix of size p×p.

Figure 7A:
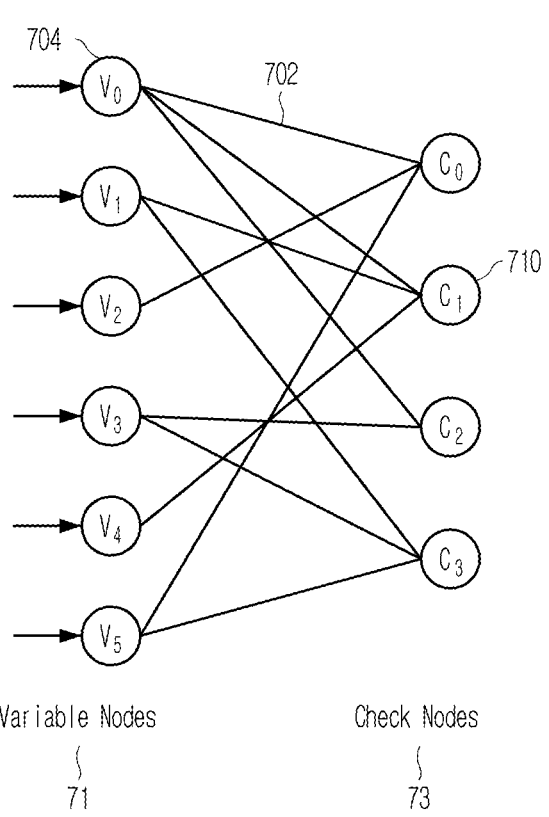
FIGS. 7A and 7B illustrate a Tanner graph representation of the LDPC code and user bits, check nodes and parity bits.

FIG. 6 illustrates an example parity-check matrix H 600, and FIG. 7A illustrates an example bipartite graph corresponding to the parity-check matrix 600.

Figure 7B:
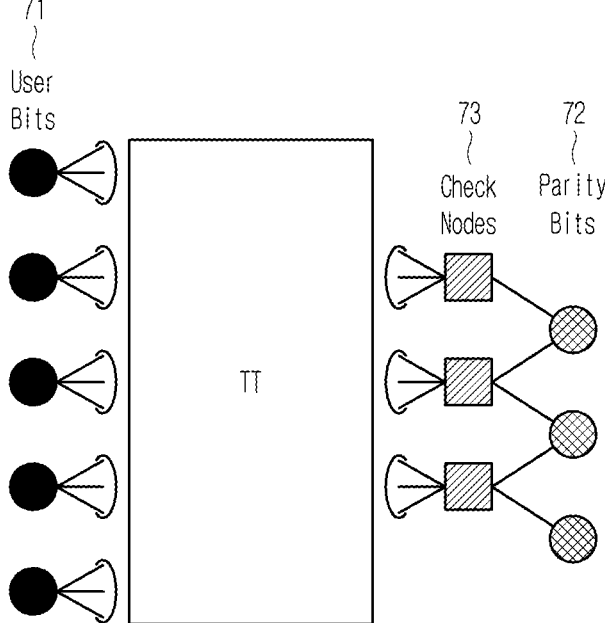

As shown in FIG. 6, the illustrative parity-check matrix 600 has six column vectors and four row vectors. Network 702 shown in FIG. 7A shows the network corresponding to the parity-check matrix 600 and represent a bipartite graph. Various types of bipartite graphs are possible, including, for example, a Tanner graph. A Tanner graph representation of an LDPC code, with user bits 71, parity bits 72 and check nodes 73, is shown in FIG. 7B.

In general, the variable nodes in network 702 correspond to the column vectors in the parity-check matrix 600. The check nodes in network 702 correspond to the row vectors of the parity-check matrix 600. The interconnections between the nodes are determined by the values of the parity-check matrix 200. Specifically, a "1" indicates the corresponding check node and variable nodes have a connection. A "0" indicates there is no connection. For example, the "1" in the leftmost column vector and the second row vector from the top in the parity-check matrix 600 corresponds to the connection between the variable node 704 and the check node 710.

A message passing algorithm may be used to decode LDPC codes. Several variations of the message passing algorithm exist in the art, such as min-sum (MS) algorithm, sum-product algorithm (SPA) or the like. Message passing uses a network of variable nodes and check nodes, as shown in FIG. 7A.

A hard decision message passing algorithm may be performed. In a first step, each of the variable nodes sends a message to one or more check nodes that are connected to it. In this case, the message is a value that each of the variable nodes believes to be its correct value.

In the second step, each of the check nodes calculates a response to send to the variable nodes that are connected to it using the information that it previously received from the variable nodes. This step can be referred as the check node update (CNU). The response message corresponds to a value that the check node believes that the variable node should have based on the information received from the other variable nodes connected to that check node. This response is calculated using the parity-check equations which force the values of all the variable nodes that are connected to a particular check node to sum up to zero (modulo 2).

At this point, if all the equations at all the check nodes are satisfied, the decoding algorithm declares that a correct codeword is found and it terminates. If a correct codeword is not found, the iterations continue with another update from the variable nodes using the messages that they received from the check nodes to decide if the bit at their position should be a zero or a one by a majority rule. The variable nodes then send this hard decision message to the check nodes that are connected to them. The iterations continue until a correct codeword is found, a certain number of iterations are performed depending on the syndrome of the codeword (e.g., of the decoded codeword), or a maximum number of iterations are performed without finding a correct codeword.

At each iteration of the decoding, the systematic (user) bits 71 and the low-degree parity bits 72 (such as shown in FIG. 7B), may be decoded alternatively. The user bits 71 may be decoded one-by-one using for example MS operations. The low-degree parity bits 72 may be jointly decoded using the results of the user bits 71. The results from the joint decoding may be used for the next iteration.

NAND Flash Organization

In NAND flash, cells are organized into word-lines (WLs), and WLs are organized into blocks. A die typically contains thousands of blocks. To read the data, sensing biases (referred to hereafter as voltage thresholds Vt) are applied to a target word line (WL) being read, and a "0/1" will be returned depending on the voltage of each cell on the WL. To reduce errors, an optimal voltage needs to be applied. The optimal Vt for each WL can be different, depending on contemporaneous NAND conditions such as retention time, read disturb count, endurance cycle, WL index, block index and die coordinates on the wafer etc.

Due to this complication, die and/or block based history read algorithms have been applied to existing memory device products to track optimal read biases so that the failure rate of the first read can be minimized, resulting in improved Quality of Service (QoS).

This disclosure addresses issues found by the present inventors with prior die and block history reads, and advances a novel history read policy referred to hereinafter as a "group history read" or GHR. In one embodiment, the group history read scheme dynamically adjusts its policy to achieve the optimal QoS for the contemporaneous NAND conditions.

Die and Block History Read

Die history read means that all the pages in the same die will share a common read bias for the first read. If any page in the same die fails the first read and is recovered in the deeper stages of defense flow (subsequent error correction), the read bias used in the successful defense stage will replace the die history read entry and be used as first read bias for all pages in the same die in future until the read bias is updated again. A block history read performs similar to the die history read except that the read bias is updated/used for all pages in the same block. In one embodiment, die and block history can use different biases for each page type, meaning for example that all least significant bit (LSB) pages in a die share the same LSB die history read bias, all most significant bit (MSB) pages in a die share the same MSB die history read bias, and so on.

History read typically tracks the optimal read bias and hence reduces the failure rate of the first read and provides good QoS to the host. A block history read may be considered to be better than die history read because a block history read has more flexibility and allows different blocks to have its own optimal read bias. The present inventor through testing have found this presumption not true.

The reason is that a block history read has a few thousand times higher update complexity than a die history read. Consider a die, which contains 2000 blocks, of data is written and is retained for 15 days. After 15 days of retention, all pages in the die will fail the first read and will typically need 3 reads to find an optimal bias to recover the data after the 15-day retention. Accordingly, it takes 6000 reads to fully update the block history read entries for this die. As a comparison, die history read only typically requires 3 reads to update the history read bias to the optimal value. On the other hand, die history read may suffer from a back-and-forth situation. For example, assume that 1000 blocks in the die have optimal Vt at V1 and the other 1000 blocks have an optimal Vt at V2. If V1 and V2 (each work well meaning read-back data is decodable for the first and second 1000 blocks) and yet are far apart, then die history read using V1 will fail the first read of second 1000 blocks. Similarly, die history read using V2 will fail the first read of first 1000 blocks. As a comparison, if block history read is used, no second read will be triggered. It is not a simple question which, die or block, policy is better for QoS, and the answer depends on the contemporaneous NAND conditions.

In one embodiment of the present disclosure, there is provided a novel process designed to provide an optimal policy for arbitrary and dynamic NAND conditions.

Group History Read (GHR)

To illustrate how an optimal policy depends on NAND conditions, die history will be the best policy when all blocks in the die have a similar optimal Vt. On the other hand, if all blocks have sufficiently different optimal Vt, block history read will be the best policy.

A GHR policy can utilize a divergence metric (DM) to measure if the optimal Vts of the pages in the same group are similar. In one embodiment, if DM is larger than a certain threshold, a group will be partitioned into smaller group. The GHR policy can provide a relatively simple and effective algorithm for group partition. The GHR policy can determine how best to treat cold data.

Granularity of a Group

Depending on the choice of implementation, a group may consist of multiple pages in the block such as a WL/page group, or a block or super block, or even a whole die. A smaller granularity requires more memory for storing the program for updating Vt nut has more flexibility and higher update complexity. In one embodiment of the present disclosure, the GHR policy uses small granularity only when necessary.

Divergence Metric (DM)

Figure 8:
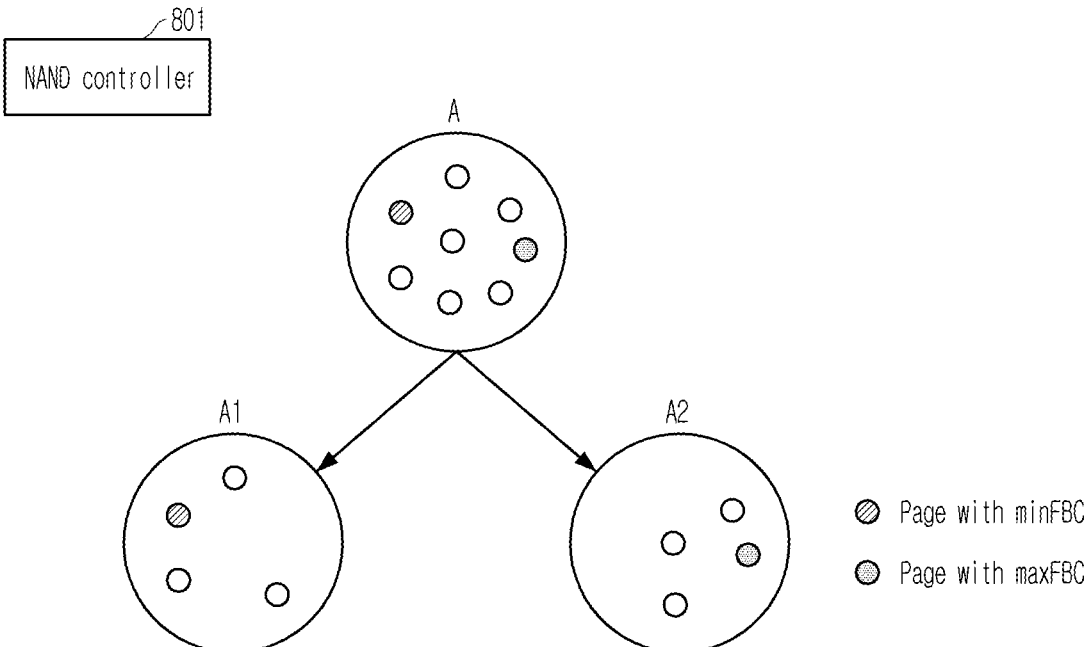
FIG. 8 is a depiction of Group A partitioned into Group A1 and Group A2, in accordance with one embodiment of the present invention.

To determine if all pages in the same group have similar optimal voltage thresholds, a NAND controller 801 as shown in FIG. 8 (or which can be control component 120 or control circuit 220 in FIG. 2) records the maximum and minimum fail bit counts (maxFBC and minFBC) of each group. A function, f(maxFBC, minFBC) can be used to indicate/track the divergence of the group. One example of such a function can be 2(maxFBC−minFBC)/(maxFBC+minFBC).

Group Partition

In one embodiment of the present disclosure, when both conditions of a) DM is larger than a threshold and b) maxFBC is close to the ECC correction capability of the NAND controller are met. For example, if the maxFBC is above 70% of the ECC correction capability, a group can be partitioned into smaller groups using the following partitioning algorithm.

1. Is DM larger than a threshold, say 50%. Yes or No.
2. If Yes and if maxFBC is close to the ECC correction capability of the NAND controller, for example if maxFBC is larger than 70% of the ECC correction capability, partition Group A into smaller sub-groups.

The present disclosure is not limited these values for maxFBC and DM. Other values for maxFBC ranging from 60% to 95% could be used. Other values for DM ranging from 20% to 80% could be used.

When group A needs to be partitioned into smaller groups, the following recursive algorithm can be applied.

1. Partition group A into two sub-groups A1 and A2 such that any page associated with minFBC is partitioned into sub-group A1 and any page associated with maxFBC is partitioned into sub-group A2. FIG. 8 shows this partitioning by NAND controller 801.
2. Process more host read commands on the pages.

3. Calculate DM, maxFBC and minFBC for all groups and determine if any other group or sub-group needs to be partitioned. If yes, go to 1. Otherwise, go to 2.

Group History Read and Group Partition

When a page fails a first read/group history read, the NAND controller 801 in FIG. 8 may assign a pre-determined number (e.g., min-sum hard decoding correction capability) as this page's maxFBC in order to check whether the two above-noted partition conditions (i.e., DM is larger than a threshold, and maxFBC is close to the ECC correction capability) are satisfied or not. If the conditions are satisfied, NAND controller 801 starts the group partition operation using the recursive algorithm noted above.

In the "group partition" operation, group A is partitioned into two sub-groups A1 and A2. While the minFBC page and maxFBC page splitting is deterministic (any page associated with minFBC is partitioned into sub-group A1 and any page associated with maxFBC is partitioned into sub-group A2), the other pages can be randomly distributing into sub-groups A1 and A2, which may cause multiple rounds of partitioning if any of the sub-groups meet the conditions of the partitioning algorithm noted above.

The following extension of the above recursive algorithm can be used at the cost of requiring more memory for the GHR policy. In one embodiment, NAND controller 801 generates two queues, (Q1 and Q2). NAND controller 801 sets two FBC thresholds alpha and beta, for example 30% and 60% of the ECC correction capability. The present disclosure is not limited to these exemplary thresholds. Thresholds of 20% and 80% or 10% and 90% or 5% and 95% can be used. If the FBC of a page is less than alpha, NAND controller 801 indexes this page for Q1. If the FBC of a page is larger than beta, NAND controller 801 indexes this page for Q2. When A is partitioned, NAND controller 801 can place the Q1 indexed pages into A1, and place Q2 indexed pages into A2, and randomly place the rest unindexed pages into sub-groups A1 and A2. Q1 and Q2 can have a limited small size. (When the queue size is zero, it degrades to the original recursive algorithm above). When either or both of the queues Q1 and Q2 becomes full, NAND controller 801 is programmed not to add another page index. In this way, sub-group A1 is more likely to have relatively low FBC pages, and sub-group A2 is more likely to have relatively high FBC pages. In this way, the divergence metric for sub-group A1 is reduced compared to the divergence metric for group A.

Group Merge

When all conditions below are met, NAND controller 801 can merge a set S of two or multiple groups:

1. Optimal Vts of all groups in S are similar;
2. maxFBC of all groups are less than 70% of ECC correction;
3. DM of all groups are less than 50%.

As noted above, the present disclosure is not limited these values for maxFBC and DM. Other values for maxFBC ranging from 60% to 95% could be used. Other values for DM ranging from 20% to 80% could be used.

In the merged set(s), all pages in each group will share the same optimal read bias. If any page enters into a deeper stage of defense flow, the group history read bias will be replaced by a successful read bias found. In one embodiment, the NAND controller 801 can determine if two different read biases are similar by using a distance metric such as Euclidian distance or weighted Euclidian distance between two read biases.

In one embodiment, NAND controller 801 monitors the conditions for group partition and merge (over a predetermined periodic time interval) and performs partitioning and merging if the conditions above for the partitioning algorithm are met. Due to this periodical dynamic grouping, NAND controller 801 (programmed with an algorithm for monitoring and merging) is able to maintain optimal read biases (with respect to improving the success rate of the first read, that is minimizing a trigger rate of second reads) even when NAND condition is changing and when data traffic is changing.

Cold Data Handling

In the group history read algorithms described above, there is no need for additional reads, and the NAND controller 801 solely relies on host reads to perform group partition/merge and history read bias update. For cold data blocks, there are no host reads available to perform group history read algorithm.

Usually there is no QoS requirement (or only few QoS requirements) on the cold data blocks. In one embodiment, NAND controller 801 treats all cold blocks as a special group, called cold data group and can use a classical die or block history read to keep track of the first read bias. Another way is to use media scan read (where all the pages in the SSD are scanned every n days, say every 20 days) to perform a group history read on cold data blocks. Media scan read is one mechanism to prevent data loss due to data retention. When for the media scan read the FBC of some page is found above a pre-determined threshold, the data on the associated block may be reclaimed.

Use of Meta Information

If some meta information, such as the average/max ones count and asymmetric ratio of errors, retention time, read disturb count, endurance etc., is available in firmware, NAND controller 801 can use this meta information to improve group partitioning and merging. The meta information would supplement the FBC in determining the partitioning of the pages read into sub-groups with lower divergence metrics.

Data Reclaim

In one embodiment, when a block is reclaimed, data associated with the block should be removed from the group. When a block is newly opened, it should be assigned to a newly created group with default history read.

Power-Off

In one embodiment, when there is a normal power-off, the group information and group history read bias should be stored to a single layer cell (SLC) area of the memory. At next power on, the information will be loaded back to FW. In another embodiment, when there is a sudden power-off, group information and group history read bias information may not be successfully stored to the SLC area. At the next power on, the initial state values of voltage thresholds (Vt) of the group will be applied, and the group history read algorithms noted above can be used with the host reads to help adapt the group and group history read information to be optimal.

Operational Methods

FIG. 9 is a flowchart depicting a method for reading data from a memory in accordance with one embodiment of the present invention. As illustrated in FIG. 9, the method reads data from a memory group of the memory. At 901, the method calculates a group divergence metric for read biases used to read the data from the memory group. At 903, the method, when the group divergence metric meets a threshold, the method partitions the memory group into a first sub-group and a second sub-group, wherein the first sub-group has a lower error rate than the second sub-group. At 905, the method reads data from the first and second sub-groups. At 907, the method calculates respective sub-group divergence metrics for the read biases used to read the data from the first and second sub-groups. At 909, the method, when one of the sub-group divergence metrics meets the threshold, partitions the one sub-group of the first and second sub-groups which met the threshold into a third sub-group.

In one aspect of this method, the divergence metric is function of at least one of a maximum failed bit count (maxFBC) and a minimum failed bit count (minFBC).

In one aspect of this method, the divergence metric is calculated from $2(\text{maxFBC}-\text{minFBC})/(\text{maxFBC}+\text{minFBC}))$.

In one aspect of this method, the partitioning the memory is based on the maxFBC being less than an error correction capability.

In one aspect of this method, the first sub-group includes a first page of the data read from the memory group that is associated with the minFBC, and the second sub-group includes a second page of the data read from the memory group that is associated with the maxFBC.

In one aspect of this method, first and second queues are provided, wherein the first queue indexes all pages of data that have a failed bit count (FBC) less than 30% of the error correction capability, for partitioning into the first sub-group, and the second queue indexes all pages of data that have the FBC larger than 60% of the error correction capability, for partitioning into the second sub-group.

In one aspect of this method, any sub-groups including at least the first and second sub-groups are merged together to form a set of two or more multiple groups which all have similar optimal read thresholds and which all have maxFBCs less than 70% of an error correction capability.

In one aspect of this method, the memory group comprises one of a word line group, a page group, a block, a super block, and a memory die, and the first and second sub-groups comprise partitions from one of the word line group, the page group, the block, the super block, and the memory die.

In one aspect of this method, cold data blocks are placed into a fourth sub-group.

In one aspect of this method, optimal read thresholds for the first and second sub-groups are stored into a single level cell page.

Memory System

In the present invention, there is provided a memory system comprising a memory device, a controller in communication with and configured to control the memory device. The controller is configured to read data from a memory group of the memory device; calculate a group divergence metric for read biases used to read the data from the memory group; when the group divergence metric meets a threshold, partition the memory group into a first sub-group and a second sub-group, wherein the first sub-group has a lower error rate than the second sub-group; read data from the first and second sub-groups; calculate respective sub-group divergence metrics for the read biases used to read the data from the first and second sub-groups; and when one of the sub-group divergence metrics meets the threshold, partition the one sub-group of the first and second sub-groups (which met the threshold) into a third sub-group.

In one aspect of this system, the divergence metric is function of at least one of a maximum failed bit count (maxFBC) and a minimum failed bit count (minFBC).

In one aspect of this system, the divergence metric is calculated from $2(\text{maxFBC}-\text{minFBC})/(\text{maxFBC}+\text{minFBC}))$.

In one aspect of this system, the controller is configured to partition the memory based on the maxFBC being less than an error correction capability.

In one aspect of this system, the first sub-group includes a first page of the data read from the memory group that is associated with the minFBC, and the second sub-group includes a second page of the data read from the memory group that is associated with the maxFBC. In one aspect of this system, the controller is configured to provide first and second queues, wherein the first queue indexes all pages of data that have a failed bit count (FBC) FBC less than 30% of the error correction capability, for partitioning into the first sub-group, and the second queue indexes all pages of data that have the FBC larger than 60% of the error correction capability, for partitioning into the second sub-group.

In one aspect of this system, the controller is configured to merge together any sub-groups including at least the first and second sub-groups to form a set of two or more multiple groups which all have similar optimal read thresholds and which all have maxFBCs less than 70% of an error correction capability.

In one aspect of this system, the memory group comprises one of a word line group, a page group, a block, a super block, and a memory die, and the first and second sub-groups comprise partitions from one of the word line group, the page group, the block, the super block, and the memory die.

In one aspect of this system, the controller is configured to place cold data blocks into a fourth sub-group.

In one aspect of this system, the controller is configured to store optimal read thresholds for the first and second sub-groups into a single level cell page.

Although the foregoing embodiments have been described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive.

What is claimed is:

1. A method for reading data from a memory, comprising:
reading data from a memory group of the memory;
calculating a group divergence metric for read biases used to read the data from the memory group;
determining that the group divergence metric meets a threshold;
when it is determined that the group divergence metric meets the threshold, partitioning the memory group into a first sub-group and a second sub-group, wherein the first sub-group has a lower error rate than the second sub-group;
reading data from the first and second sub-groups;
calculating respective sub-group divergence metrics for the read biases used to read the data from the first and second sub-groups; and
determining that one of the sub-group divergence metrics meets the threshold;
when it is determined that one of the sub-group divergence metrics meets the threshold, partitioning the one sub-group of the first and second sub-groups which met the threshold into a third sub-group and a fourth sub-group.

2. The method of claim 1, wherein the divergence metric is function of at least one of a maximum failed bit count (maxFBC) and a minimum failed bit count (minFBC).

3. The method of claim 2, wherein the divergence metric is calculated from $2(maxFBC-minFBC)/(maxFBC+minFBC))$.

4. The method of claim 2, wherein the partitioning the memory is based on the maxFBC being less than an error correction capability.

5. The method of claim 4, wherein
the first sub-group includes a first page of the data read from the memory group that is associated with the minFBC, and
the second sub-group includes a second page of the data read from the memory group that is associated with the maxFBC.

6. The method of claim 4, further comprising:
providing first and second queues, wherein
the first queue indexes all pages of data that have a failed bit count (FBC) less than 30% of the error correction capability, for partitioning into the first sub-group, and
the second queue indexes all pages of data that have the FBC larger than 60% of the error correction capability, for partitioning into the second sub-group.

7. The method of claim 1, further comprising merging together any sub-groups including at least the first and second sub-groups to form a set of two or more multiple groups which all have similar optimal read thresholds and which all have maxFBCs less than 70% of an error correction capability.

8. The method of claim 1, wherein
the memory group comprises one of a word line group, a page group, a block, a super block, and a memory die, and
the first and second sub-groups comprise partitions from one of the word line group, the page group, the block, the super block, and the memory die.

9. The method of claim 1, further comprising placing cold data blocks into a fourth sub-group.

10. The method of claim 1, further comprising storing optimal read thresholds for the first and second sub-groups into a single level cell page.

11. A memory system comprising:
a memory device; and
a controller in communication with and configured to control the memory device, wherein the controller is configured to:
read data from a memory group of the memory device;
calculate a group divergence metric for read biases used to read the data from the memory group;
when the group divergence metric meets a threshold, partition the memory group into a first sub-group and a second sub-group, wherein the first sub-group has a lower error rate than the second sub-group;
read data from the first and second sub-groups;
calculate respective sub-group divergence metrics for the read biases used to read the data from the first and second sub-groups; and
when one of the sub-group divergence metrics meets the threshold, partition the one sub-group of the first and second sub-groups which met the threshold into a third sub-group and a fourth sub-group.

12. The system of claim 11, wherein the divergence metric is function of at least one of a maximum failed bit count (maxFBC) and a minimum failed bit count (minFBC).

13. The system of claim 12, wherein the divergence metric is calculated from $2(maxFBC-minFBC)/(maxFBC+minFBC))$.

14. The system of claim 12, wherein the controller is configured to partition the memory based on the maxFBC being less than an error correction capability.

15. The system of claim 14, wherein the first sub-group includes a first page of the data read from the memory group that is associated with the minFBC, and the second sub-group includes a second page of the data read from the memory group that is associated with the maxFBC.

16. The system of claim 15, wherein the controller is configured to provide first and second queues, wherein the first queue indexes all pages of data that have a failed bit count (FBC) less than 30% of the error correction capability, for partitioning into the first sub-group, and the second queue indexes all pages of data that have the FBC larger than 60% of the error correction capability, for partitioning into the second sub-group.

17. The system of claim 15, wherein the controller is configured to merge together any sub-groups including at least the first and second sub-groups to form a set of two or more multiple groups which all have similar optimal read thresholds and which all have maxFBCs less than 70% of an error correction capability.

18. The system of claim 11, wherein the memory group comprises one of a word line group, a page group, a block, a super block, and a memory die, and the first and second sub-groups comprise partitions from one of the word line group, the page group, the block, the super block, and the memory die.

19. The system of claim 18, wherein the controller is configured to place cold data blocks into a fourth sub-group.

20. The system of claim 19, wherein the controller is configured to store optimal read thresholds for the first and second sub-groups into a single level cell page.

* * * * *